Sept. 26, 1967 R. G. ELLIOTT ET AL 3,344,397
COMPOUND DIAPHRAGM SPRING
Filed April 30, 1965

INVENTORS
ROBERT G. ELLIOTT &
HAROLD A. YANTIS
BY
/ATTORNEY

United States Patent Office 3,344,397
Patented Sept. 26, 1967

3,344,397
COMPOUND DIAPHRAGM SPRING
Robert G. Elliott and Harold A. Yantis, Columbus, Ohio, assignors to International Research and Development Corporation, Worthington, Ohio, a corporation of Ohio
Filed Apr. 30, 1965, Ser. No. 452,244
8 Claims. (Cl. 340—17)

This invention relates to a compound diaphragm spring and to an improved electromechanical transducer of the seismic variety utilizing the same.

Seismic electromechanical transducer devices utilizing diaphragm springs are described in the art. U.S. Patent 2,754,435 and U.S. Patent 3,157,852. These transducer devices serve to generate an oscillatory electrical signal which corresponds to mechanical vibrations applied to the device. They are widely used for measuring and analyzing cyclic vibratory forces such as those which are manifested by the rotation of an unbalanced rotor. For universal applicability, these transducer devices are required to provide an electrical signal output which is related to the instantaneous velocity of a current-generating element which is suspended by the diaphragm springs. The diaphragm springs themselves possess many individual ribbons or reeds which have independent natural resonating frequencies.

As described in the aforementioned U.S. Patent 3,157,852, a coating of thermoplastic resin can be applied to the individual ribbons of the diaphragm springs to minimize the tendency of such ribbons to oscillate at their inherent resonating frequency. While such thermoplastic resinous coatings have greatly improved the performance of the seismic electromechanical transducers, there are still unpredictable output signals from the transducers resulting from resonating movement of the diaphragm spring ribbons or reeds. Such unpredictable output signals may deviate more or less from the intended signal due to the actual mechanical vibrations by fifty percent or greater.

According to this invention, the reed resonance of such diaphragm springs is overcome by providing a second disk having inwardly extended involute fingers corresponding in number with the involute grooves of the diaphragm spring. The second disk is securely fastened to the diaphragm spring at the rim and the involute fingers of the second disk are interwoven through the involute ribbons of the diaphragm spring. The second disk engages the diaphragm spring along its rim and also in limited areas where the involute fingers extend radially inwardly across individual involute reeds.

Preferably the involute grooves of the diaphragm spring are tapered whereby they are wider in the central portion of their length. Preferably a resilient substance, such as high temperature grease, is applied to the involute fingers of the second disk over those limited areas where the fingers engage the involute ribbons of the diaphragm spring.

Compound diaphragm springs constructed and assembled in this manner have virtually eliminated the unpredictable output signals which result from the reed resonance of the diaphragm springs.

The present invention, its objects and advantages, will be more fully described in the following detailed description by reference to the accompanying drawings in which.

Figure 1:
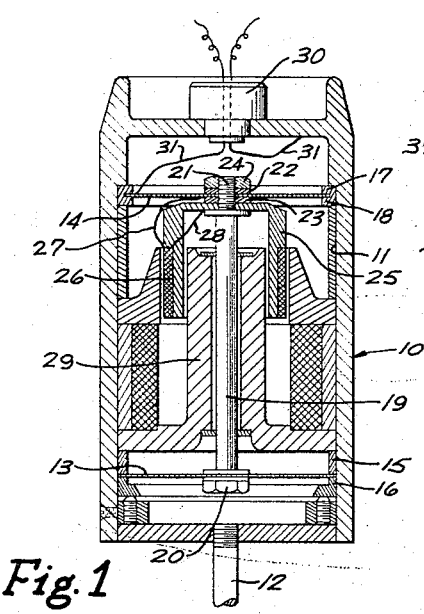
FIGURE 1 is a generalized representation, in cross-section, of a typical seismic electromechanical transducer.

As shown in FIGURE 1, a typical electromechanical transducer includes a casing 10 having a cylindrical inner bore 11 and having a forwardly extending prod 12 for transmitting mechanical vibrations to the casing 10. A pair of diaphragm springs 13, 14 is mounted within the bore 11. The diaphragm springs 13, 14 are secured around their rims by annular rings 15, 16, 17, 18. The rings 17, 18 are fabricated from electrically non-conducting substances whereby the diaphragm spring 14 is electrically insulated from the casing 10. A rigid shaft 19 connects the centers of the two diaphragm springs 13, 14 and, as shown is a bolt having a head 20 and a threaded end 21, which passes through an insulating washer 22, the diaphragm spring 14, an insulating washer 23, and is threadedly engaged with a nut 24. It will be seen that the diaphragm spring 14 is electrically insulated from the housing 10 and from the rigid shaft 19.

Also secured to the rigid shaft 19 is a signal bobbin 25 which is wrapped with a coil 26 having many thousands of turns of electrical conductor having a first end 27 electrically connected to the diaphragm spring 14 and a second end 28 is electrically connected to the rigid shaft 19. A permanent magnet 29 is mounted within the bore 11 to provide a constant field of magnetic flux in which the signal bobbin 25 will oscillate while generating the desired electrical signal.

A bushing 30 is provided on the rear head of the casing 10 about an aperture through which a pair of conductors 31, 32 enter the interior of the casing 10. The conductor 31 is electrically connected to the diaphragm spring 14 adjacent to its rim. The conductor 32 is electrically connected to the casing 10.

In operation, the forward prod 12 engages a vibratory element. The mechanical vibrations of the vibratory element are transmitted mechanically through the prod 12 to the casing 10. The casing 10 thereby is caused to vibrate in harmony with the vibrating element. The inertia of the spring-mass system including the rigid shaft 19 and the signal bobbin 25 presents a tendency for that spring-mounted element to remain at rest despite the vibratory movement of the casing 10. As a result, the signal coil 26 experiences relative movement with respect to the magnetic flux of the magnet 29 and thereby generates an induced electrical oscillating signal which is delivered to the conductors 31, 32. The conductor 28 of the coil is grounded to the casing 10 by means of a direct electrical path including the coil end 28, the rigid shaft 19, the diaphragm spring 13 and the annular rings 15, 16. The other end of the electrical coil is connected to the conductor 31 by a path including the conductor 27, the diaphragm spring 14 and the conductor 31.

Figure 2:
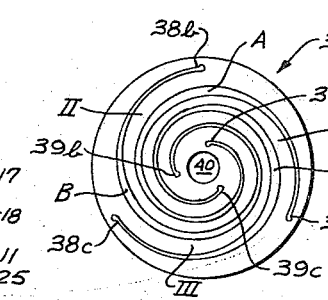
FIGURE 2 is a plan view of a diaphragm spring having involute grooves, involute ribbons or reeds and showing the preferred tapered configuration of the involute grooves.

The diaphragm springs 13, 14 of the prior art are clearly illustrated in the two prior art references hereinabove mentioned. The present diaphragm spring includes the diaphragm 35 itself, shown in FIGURE 2, a second disk 36 having inwardly directed involute fingers shown in FIGURE 3 which are assembled together in an interwoven manner as shown in FIGURE 4. The diaphragm spring 35 of the present invention has a plurality of involute grooves each of which commences at a point 38 which is spaced about the disk adjacent to the rim and terminates at a point 39 adjacent to the central hole 40. It will be observed that each of the involute grooves A, B, C is narrow at the end which is adjacent to its outer extremity 38 and also narrow at its end which is adjacent to its inner extremity 39 but is tapered to a maximum width intermediate the terminal points 38, 39. These diaphragm springs are fabricated from flat sheets of beryllium-copper alloys having a thickness of about 4 mils. The disks have a diameter between 1.5 and 2 inches. As shown in FIGURE 2, the diaphragm spring has three involute grooves A, B, C and the starting points 38 are spaced about 120° apart around the rim. Likewise the interior terminal points 39 are spaced apart by about 120° adjacent to the central hole 40. Accordingly there are provided three ribbons or reeds identified by the numerals I, II, III. The ribbon I commences at the starting point 38a and terminates at the terminal point 39c. The ribbon II commences at the starting point 38b and terminates at the terminal point 39a. The ribbon III commences at the starting point 38c and terminates at the terminal point 39b. Each of the ribbons or reeds I, II, III is wider at its ends than at its central portion. The grooves A, B, C are widened radially outwardly at the points 38 for stress relief which is thereby achieved without necking down the width of the ribbons I, II, III. Likewise at the center of the disk, the involute grooves A, B, C are widened in a radially inward direction to provide the stress relief without necking down the width of the ribbons I, II, III.

Figure 3:
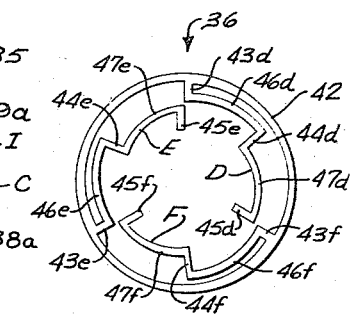
FIGURE 3 is a plan view of the second disk element of the present compound diaphragm spring showing the involute fingers.
Figure 4:
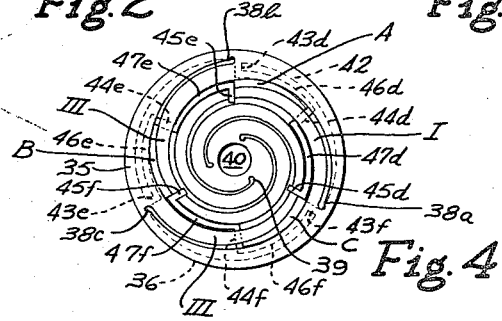
FIGURE 4 is a plan view of the present compound diaphragm spring showing the second disk of FIGURE 3 interwoven with the diaphragm spring of FIGURE 2.

The second disk 36 as illustrated in FIGURE 3 preferably is fabricated from the same berylium-copper alloy as the diaphragm spring 35. The disk 36 has an uninterrupted rim 42 and a number of spaced-apart inwardly directed involute fingers D, E, F. Each of the involute fingers D, E, F, has an initial radial portion 43, an intermediate radial portion 44 and a terminal radial 45. Each of the involute fingers D, E, F also has an outer involute portion 46 and an inner involute portion 47. The involute portions 46, 47 correspond to the involute grooves A, B, C of the diaphragm spring 35. The radial portions 43, 44, 45 span across the ribbons I, II, III in such manner that each of the fingers D, E, F engages each of the three ribbons I, II, III.

The compound diaphragm spring is shown in FIGURE 4. The second disk 36 is superposed on the diaphragm spring 35 in such manner that the first radial portions 43 are displaced clockwise from the starting points 38. The second radial portions 44 are presented on the same side of the diaphragm spring 35 as the rim 42. The terminal radial portions 45 are woven through the grooves A, B, C to appear on the opposite side of the diaphragm spring 35 from the rim 42. The involute portions 46, 47 thereby are presented between the ribbons I, II, III.

The second disk 36 is secured to the diaphragm spring 35 preferably by means of spot soldering along the rim 42. Where the radial portions 44, 45 overlie the ribbons I, II, III, a dot of resilient material such as a high temperature grease preferably is applied. The high temperature grease remains sufficiently tacky to keep the radial portion 44, 45 in surface contact with the ribbons I, II, III and yet allows for relative movement of the radial portions 44, 45 with respect to the ribbon which is necessitated by the fact that the involute fingers D, E, F move in the opposite helical direction from the ribbons I, II, III. That is, where the ribbons I, II, III proceed from the rim in a counterclockwise direction, the involute fingers D, E, F necessarily proceed from the rim 42 in a clockwise direction. As the diaphragm spring 35 oscillates in both directions out of its normally flat plane, the involute fingers D, E, F, are carried along with those oscillatory movements but with the opposite torsional displacement. The tacky substance is intended to accommodate this differential movement and provide viscous damping. A preferred high temperature grease for this purpose is Dow Corning Silicone Compound 11 which is described as being a heavy consistency water repellant lubricant for high temperature valves, seals, O-rings and high vacuum applications. Its temperature range is from −40° F. to +500° F.

*Comparative results*

Figure 5:
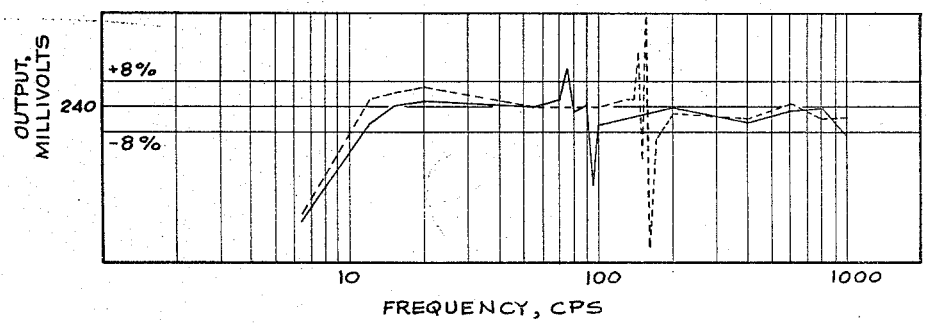
FIGURE 5 is a graphical representation of the electrical signal output of a prior art seismic transducer utilizing a prior art diaphragm spring of the type shown in FIGURE 2.

The response of prior art seismic electromechanical transducers of the type described in U.S. Patent 3,157,852 is plotted in FIGURE 5 for a typical specific instrument. A vibratory source was maintained at a constant velocity shake through a normal range of frequencies, i.e., 12 cycles per second through 1,000 cycles per second. Since the velocity of the shake was maintained constant, the electrical signal output from the instrument should be constant. The applied shake corresponds to an output of 240 millivolts. A reasonable standard of performance for such instruments requires that the deviation from constant output (240 millivolts) not exceed ±8 percent between 12 cycles per second and 1,000 cycles per second. Accordingly the output of FIGURE 5 should be confined between the horizontal lines at 220.8 millivolts and 259.2 millivolts. The instrument was tested with its axis horizontal to produce the solid line response curve and with its axis vertical to produce the dash-line response curve. It will be seen that the solid line response curve exceeds the constant output by more than 8 percent at 75 cycles per second and is less than 92 percent of the constant output at 96 cycles per second. The dashed-line response curve exceeds the constant output by more than 8 percent at 155 cycles per second and is less than 92 percent of the constant output at 150 cycles per second and 160 cycles per second. Thus the actual location of the resonance-created output errors differs according to the posture (horizontal or vertical) of the measuring instrument. Moreover the frequency at which the excess deviations occur will vary significantly and unpredictably from one instrument to another. While the instrument is quite reliable over the overwhelming portion of its range, these minor portions of the operable range produce erroneous results. If unbalance determination measurements were made with such transducers at these sensitive frequencies, results could be in error by 50 percent or more. Where the ultimate use of the transducer instrument is known, a particular instrument may be deliberately selected which does not present any resonant-response deviations at the anticipated frequency of measurement. However where a universal transducer is required, it is desirable to eliminate these unpredictable deviations.

The specific transducer instrument which was used to develop the data presented in FIGURE 5 was dismantled and reconstructed by replacing its two diaphragm springs (of the type shown in FIGURE 2) with the present compound diaphragm springs of the type shown in FIGURE 4. The output response characteristics of the reconstructed transducer instrument were determined over the same vibration frequency range with the same vibratory source. That output signal response characteristic is presented in FIGURE 6.

Figure 6:
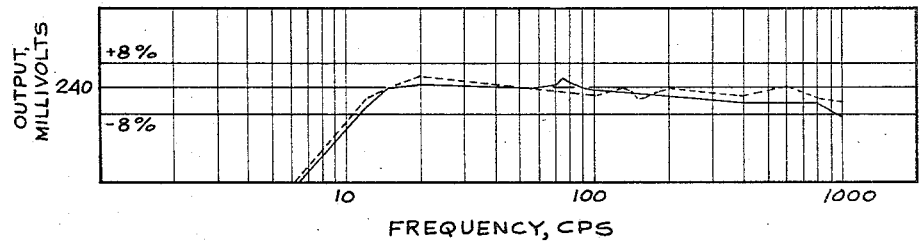
FIGURE 6 is a graphical representation of the electrical signal output of a prior art seismic electromechanical transducer utilizing the present compound diaphragm springs of FIGURE 4.

Comparing FIGURES 5 and 6, it is apparent that the unpredictable vibratory response which is due to the reed resonance has been eliminated throughout the entire range of anticipated vibration frequencies from 12 cycle per second through 1,000 cycles per second. In that normal response range the deviation from constant signal output did not exceed ±8 percent.

The foregoing seismic electromechanical transducer has been described as having a signal generating coil mounted in a fixed magnetic field by means of a pair of compound diaphragm springs. These compounds diaphragm springs also could be used in seismic electromagnetic transducers which have a spring mounted source of magnetic flux such as a permanent magnet rigidly mounted within a fixed signal generating coil. Oscillation of the spring-mounted magnet relative to the fixed coil induces an oscillatory electrical signal.

We claim:

1. A compound diaphragm spring comprising in combination a first diaphragm spring and a second circular disk assembled into a unitary structure, wherein the said diaphragm spring comprises a circular disk having a rim, an axial hole and plural involute grooves each extending (a) from one of several spaced points located adjacent to said rim to (b) one of several spaced points located adjacent to the said axial hole, the said involute grooves defining flat involute ribbons each connecting the said rim with the central portion of the disk annularly adjacent to the said axial hole, an improvement comprising:

said second circular disk having a rim secured to the rim of the first said circular disk and having plural fingers corresponding with the said involute grooves and said involute ribbons, each said finger extending inwardly from said rim across one said involute ribbon, thence along an involute path between adjacent ribbons, and thence inwardly across a different one of said ribbons, the said finger being resiliently secured to said involute ribbons at at least one of its areas of contact with a said ribbon.

2. The compound diaphragm spring of claim 1 wherein the said finger is bonded to at least one of said involute ribbons by means of a high temperature grease adhering to the exposed surfaces of the said finger and the said involute ribbon in their areas of contact.

3. The compound diaphragm spring of claim 1 wherein each said finger passes alternately over and under the said involute ribbons in a woven fashion.

4. The compound diaphragm spring of claim 1 wherein the said involute grooves are tapered and have their widest dimension intermediate (a) the said spaced point located adjacent to said rim and (b) the said spaced point located adjacent to the said axial hole.

5. In an electromechanical seismic vibration transducer having a seismic element mounted on a rigid shaft between two diaphragm springs, wherein each of the said diaphragm springs comprises a circular disk having a rim, an axial hole and plural involute grooves each extending (a) from one of several spaced points located adjacent to said rim to (b) one of several spaced points located adjacent to the said axial hole, the said involute grooves defining flat involute ribbons each connecting the said rim with the central portion of the disk annularly adjacent to the said axial hole, an improvement comprising:

a second circular disk having a rim secured directly to the rim of the first said circular disk and having plural fingers corresponding with the said involute grooves and said involute ribbons, each said finger extending inwardly from said rim across one said involute ribbon, thence along an involute path between adjacent ribbons, and thence inwardly across a different one of said ribbons, the said finger being resiliently secured to said involute ribbons at at least one of its areas of contact with a said ribbon.

6. The compound diaphragm spring of claim 1 wherein those portions of each said finger which extend across one of said ribbons, extends radially toward said axial hole.

7. The compound diaphragm spring of claim 1 wherein said involute grooves define at least three flat involute ribbons, and wherein each said finger, after extending across said different one of said ribbons, extends along an involute path between adjacent ribbons, and thence along a still different one of said involute ribbons.

8. The diaphragm spring of claim 1 wherein said flat involute ribbons extend from the first said circular spring about said axial hole in one direction and wherein said fingers extend from said rim of said second circular disc around said axial hole in the opposite direction.

References Cited

UNITED STATES PATENTS

| | | | |
|---|---|---|---|
| 2,753,544 | 7/1956 | Cox et al. | 340—17 |
| 2,788,511 | 4/1957 | Marshall | 340—17 |

BENJAMIN A. BORCHELT, *Primary Examiner.*

P. A. SHANLEY, *Assistant Examiner.*